March 6, 1962 M. L. ANTHONY 3,024,419

DISCRIMINATORS

Filed Dec. 2, 1957 3 Sheets-Sheet 1

INVENTOR:

MYRON L. ANTHONY

BY Thomas E. Dorn

ATTY.

INVENTOR.
MYRON L. ANTHONY
BY Thomas E. Dorn
ATT'Y.

March 6, 1962 M. L. ANTHONY 3,024,419

DISCRIMINATORS

Filed Dec. 2, 1957 3 Sheets-Sheet 3

INVENTOR:
MYRON L. ANTHONY
BY Thomas E. Dorn
ATT'Y.

3,024,419

DISCRIMINATORS

Myron L. Anthony, La Grange, Ill., assignor, by mesne assignments, to Peter G. S. Mero Filed Dec. 2, 1957, Ser. No. 701,282
17 Claims. (Cl. 329—103)

This invention relates to a new and improved frequency discriminator.

In frequency modulation transmission systems, information is conveyed by varying the frequency of a carrier with respect to a given reference frequency. The most common example of a system of this kind is the familiar frequency modulation system of radio broadcasting, although the same type of transmission is also used in industrial and commercial applications for transmission of data of various kinds. In such a system, it is necessary to demodulate the received signal by some means to reconstitute the information in usable form. Usually, this is accomplished by a device known as a frequency discriminator, which translates the frequency variations of the received signal into an amplitude modulated signal. The amplitude modulated signal is then applied to a speaker or other reproduction or utilization device in order to afford an audible, visible, or other representation of the received data.

Several different forms of frequency discriminator are well known in the art, the most common being the center-tuned balanced discriminator and the stagger-tuned discriminator. In each of these devices, the basic circuit element is a double diode in which the input signal is applied to the anodes of the diodes and the output is derived from the cathode circuits. Other discriminators employing triodes and more complex vacuum tubes have also been proposed and used for the detection of frequency modulated signals. Some of these circuits may be adapted directly to corresponding solid-state electric discharge devices such as crystal diodes and transistors, with varying degrees of efficiency and effectiveness in operation.

One of the difficulties most frequently encountered in previously known discriminator circuits is the tendency to develop distorted output signals with input signals having a high harmonic content. In addition, many of the known types of discriminator afford unsatisfactory results unless they are tuned to the desired reference frequency with extreme accuracy, with the result that careful adjustment of the circuits may be necessary in order to achieve accurate reproduction of the transmitted information. In part, this problem may be attributed to the fact that most of these discriminator circuits, and particularly those most commonly employed, require the use of tuned-primary tuned-secondary input transformers.

A major problem presented in transistor discriminator devices, as in other transistor applications, is the wide variations in operating characteristics of the individual transistors. The base resistance, for example, may vary substantially for individual transistors, to the extent that several units all having the same base voltage may have base currents varying by a factor of three or even more. In previously known vacuum tube discriminators, this difficulty has not been present and these circuits, if revised to utilize transistors, may be completely unsatisfactory in operation.

Another difficulty in discriminators arises from the fact that the signal output in most known devices is substantially dependent upon input signal amplitude as well as input frequency. With most known discriminators it is essential to provide a separate limiter circuit in the input to the discriminator to avoid distortion in the discriminator output due to amplitude variations in the input.

A principal object of the invention, therefore, is a new and improved frequency discriminator circuit which effectively minimizes some or all of the above-noted difficulties presented by previously known devices.

A more specific object of the invention is a new and improved discriminator circuit which is particularly well suited to the use of transistors.

Another object of the invention is a new and improved frequency discriminator which exhibits a high degree of inherent immunity to harmonic disturbance.

A further object of the invention is a new and improved frequency discriminator in which adjustments for variation in the reference frequency are effectively minimized.

A specific object of the invention is a new and improved frequency discriminator which does not require the use of a double-tuned input transformer for the intelligence signal.

A corollary object of the invention is a new and improved discriminator circuit which is inherently simple and economical in construction.

An additional object of the invention is a new and improved discriminator having inherent self-limiting characteristics.

Another object of the invention is a new and improved transistor discriminator circuit which is substantially independent, in operation, of the operating characteristics of the individual transistors employed therein.

A frequency discriminator constructed in accordance with the invention comprises a pair of electric discharge devices, preferably junction transistors. The load circuit of the discriminator comprises a pair of individual load impedances coupling the output electrodes of the discharge devices to a source of operating potential. The discriminator further includes means for applying an intelligence signal to the discharge devices with a polarity tending to render the devices conductive in alternation with each other; in most instances, this means comprises a push-pull input circuit. A frequency-responsive phase-shifting device is utilized to generate a control signal having a frequency equal to the frequency of the aforesaid intelligence signal but shifted in phase by an amount determined by the frequency of the intelligence signal, the phase shift at a given reference frequency being equal to ninety degrees. This control signal is applied to the electric discharge devices in push-push; that is, the control signal tends to render the devices conductive in coincidence with each other to develop in the load circuit of the devices an output signal having a magnitude and polarity representative of variations in the intelligence signal frequency with respect to the reference frequency.

Other and further objects of the present invention will be apparent from the following description and claims and are illustrated in the accompanying drawings which, by way of illustration, shows preferred embodiments of the present invention and the principles thereof and what is now considered to be the best mode for applying those principles. Other embodiments of the invention embodying the same or equivalent principles may be used and structural changes may be made as desired by those skilled in the art without departing from the present invention.

Figure 1:
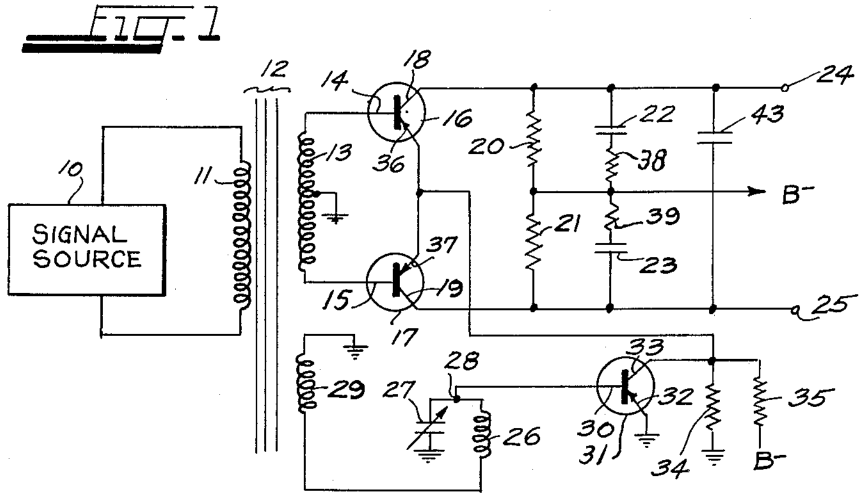
FIG. 1 is a schematic wiring diagram of a frequency discriminator constructed in accordance with one embodiment of the invention.

The frequency discriminator apparatus illustrated in FIG. 1 includes a signal source 10; source 10 may be considered to represent any source of a suitable intelligence signal modulated in frequency in accordance with information which is to be reproduced by a receiver in which the discriminator is incorporated. For example, in a conventional FM broadcast receiver, the signal source 10 may be taken to represent the usual radio frequency amplifier, converter, and intermediate frequency amplifier stages of the receiver; a limiter may also be included. In somewhat simpler systems, such as a telegraph, telephone, or other transmission arrangement utilizing wire or other carrier means, the signal source 10 may be substantially simpler in construction.

The signal source 10 is coupled to the primary winding 11 of a transformer 12 having a pair of secondaries 13 and 29. The electrical center of the secondary winding 13 is grounded and the ends of this winding are coupled to the base electrodes 14 and 15 respectively of a pair of junction transistors 16 and 17. Thus, the second winding 13 of the transformer 12 comprises an input circuit which applies the intelligence signal from source 10 to the base electrodes 14 and 15 in push-pull relationship.

The collector electrode 18 of the transistor 16 is connected to a source of negative-polarity (when PNP type transistors are used) uni-directional operating potential, conventionally designated as B—, through a first load resistor 20. In this connection, it should be noted that all of the illustrated embodiments of the invention are based on the use of PNP transistors; if NPN transistors are employed, it is only necessary to reverse the biasing polarities, as by substituting a source of positive polarity D.-C. potential for source B—. Similarly, the collector electrode 19 of the transistor 17 is connected to B— through a load resistor 21. In the illustrated embodiment, a pair of capacitors 22 and 23 are connected in parallel with load resistors 20 and 21 respectively, a pair of current-limiting resistors 38 and 39 being connected in series with the capacitors. The output of the discriminator is taken across the two load resistors 20 and 21, the output terminals being designated by reference numerals 24 and 25. A filter capacitor 43 is connected across the load terminals 24 and 25.

One terminal of the other secondary 29 of the transformer 12 is grounded. The remaining terminal of the winding 29 is connected to one terminal of an inductance represented by the coil 26. The other terminal of coil 26 is grounded through a variable capacitor 27, the common terminal 28 of coil 26 and capacitor 27 being connected to the base electrode 30 of a transistor 31. The emitter 32 of the transistor 31 is grounded. The collector 33 of this transistor is connected to a voltage divider comprising a pair of resistors 34 and 35; resistor 34 is grounded, whereas resistor 35 is returned to the negative potential source B—. The collector 33 is also connected to the emitter electrodes 36 and 37 of the two transistors 16 and 17 respectively.

Figure 2:
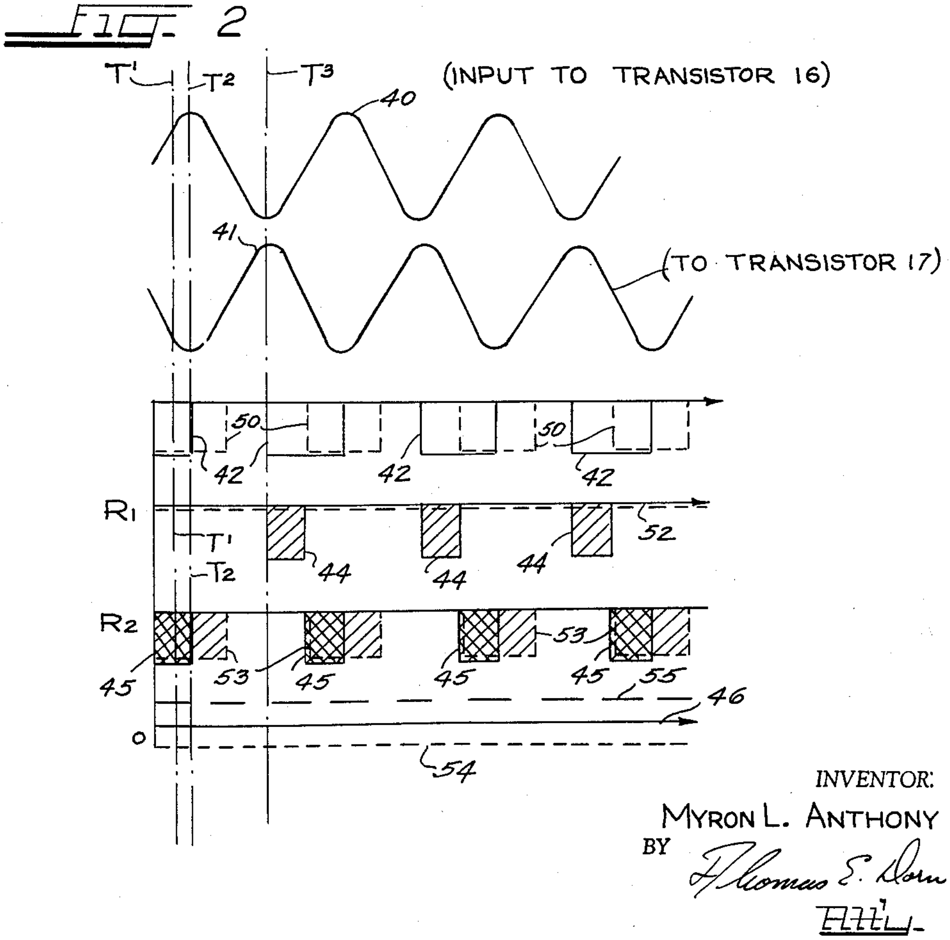
FIG. 2 is a graphical representation of signal conditions occurring in operation of the discriminator of FIG. 1.

The operation of the frequency discriminator illustrated in FIG. 1 may best be understood by reference to the signal wave forms shown in FIG. 2, which illustrate currents and voltages in the discriminator with reference to a common time axis. Thus, the first curve 40 shown in FIG. 2 illustrates the intelligence signal voltage generated in winding 13 by the signal applied to the transformer 12 from the signal source 10 and is shown as an alternataing voltage of sinusoidal wave form. Assuming that curve 40 represents the signal voltage applied to the base electrode 14 of transistor 16, the signal voltage applied to the base 15 of transistor 17 is 180° out of phase with respect to curve 40 and may be represented by the curve 41. Accordingly, it is seen that the intelligence signal is applied to the two electric discharge devices, transistors 16 and 17, with a polarity tending to render the devices conductive in alternation with each other; each of the transistors is driven toward conduction during the negative half-cycles of the applied intelligence signal.

The intelligence signal is also applied to the series resonant circuit comprising inductor 26 and capacitor 27 through the secondary winding 29 of the transformer 12. The tuned circuit 26, 27 is resonant at a given reference frequency and thus comprises a frequency-responsive phase-shifting device. The phase-shifted signal from the tuned circuit is applied to the base electrode 30 of the transistor 31, which generates in its output circuit a square wave signal voltage of the form illustrated by the solid line graph 42 in FIG. 2. Operation of the transistor 31 as a square wave amplifier is to a substantial extent dependent upon the selection of the resistors 34 and 35 in the collector circuit thereof; the larger resistor 35 is made relative to resistor 34, the lower the peak value of the square wave. These parameters should be selected to afford a square wave output under all expected conditions of input signal amplitude. The control signal output from the transistor 31, which is of the same frequency as the intelligence signal, is applied to the two emitter electrodes 36 and 37 of the transistors 16 and 17. Because this signal is applied to the two discriminator transistors in push-push relationship, it of course tends to render those transistors conductive in time coincidence with each other.

Considering circuit conditions at the time T1, it is seen that transistor 16 is non-conductive, since a positive-potential signal is applied to the base 14 of the transistor at this time. Accordingly, even though the emitter 36 is momentarily biased toward conduction by the square-wave signal 42 from transistor 31, no appreciable current flows through the transistor 16. Transistor 17, on the other hand, is conductive at time T1, since both the base electrode 15 and the emitter 37 are momentarily biased toward conduction. Accordingly, at time T1 a current flows from source B— to ground through the circuit comprising the load resistor 21, the collector electrode 19, the emitter 37 and the transistor 31.

At time T2, the transistor 31 is rendered non-conductive by the signal applied thereto from the tuned circuit 26, 27, effectively applying a negative bias on the emitter electrodes 36 and 37 of transistors 16 and 17. Consequently, for the succeeding interval between time T2 and time T3 both of the transistors 16 and 17 are cut off. At time T3, however, the emitters 36 and 37 are again returned to ground potential tending to render the transistors 16 and 17 conductive. At this time, however, transistor 17 cannot conduct because the base electrode 15 thereof has applied to it a positive-polarity signal voltage as indicated by curve 41. Transistor 16, however, becomes conductive at time T3, since the signal applied tc the base thereof (curve 40) is monentarily negative. Accordingly, with the phase relationships illustrated by the voltage curves 40, 41 and 42, and by the current graphs 44 and 45, the transistors 16 and 17 conduct in alternation with each other, the currents through the transistors and through the load resistors 20 and 21 being illustrated in FIG. 2 by the shaded portions 44 and 45 respectively. Under these circumstances, the average signal output afforded across the output terminals 24 and 25 is approximately zero as indicated by curve 46, since the voltages appearing across the two load resistors are in series opposing relationship and the average amplitudes of those voltages are equal to each other.

As long as the frequency of the intelligence signal applied to transformer 12 from source 10 is equal to the reference frequency to which the series-resonant circuit 26, 27 is tuned, the output across terminals 24 and 25 remains equal to zero; the output signal is not affected to any substantial degree by variations in amplitude of the signal input. As soon as the input signal frequency changes to any substantial extent, however, an output signal representative of that change is developed at the output terminals of the discriminator. Thus, for a given change in frequency of the input or intelligence signal, the signal appearing at terminal 28 of the discriminator may be shifted in phase by as much as ninety degrees, this representing the extreme limit of effective discriminator action for the circuit. This condition is illustrated in FIG. 2 by the dash line curve 50, which shows the output of the square wave generator comprising transistor 31 shifted in phase by ninety degrees as compared to the initial output signal 42 of this portion of the device. With the control signal shifted in phase to this extent, operating conditions in the discriminator load circuit 20, 21 are radically altered. Thus, the square wave control signal 50 does not coincide at any time with the negative-going portions of the intelligence signal 40 applied to the base electrode 14 of transistor 16. Consequently, the intelligence signal cannot render the transistor 16 conductive and no load current flows through the load resistor 20. Transistor 17, on the other hand, is effectively conditioned for conduction throughout each negative half cycle of the intelligence signal 41 applied thereto.

Under these conditions, with the square wave output signal from load resistor 21 shifted ninety degrees from its normal or reference phase, the output voltage across load resistor 20 is essentially zero as indicated by the dash line curve 52. A substantial voltage, however, is developed across the other load resistor 21 as indicated by the dash line curve 53. Accordingly, the average output voltage across terminals 24, 25 of the discriminator is no longer equal to zero; this signal is indicated in FIG. 2 by the dash line 54. Of course, if the phase of the square wave signal is shifted in the opposite direction to an equal extent, the effect on the operating conditions in the load circuit of the discriminator is exactly opposite, affording an output signal of equal amplitude but opposite polarity as indicated by line 55 in FIG. 2.

Figures 3, 4, 5:
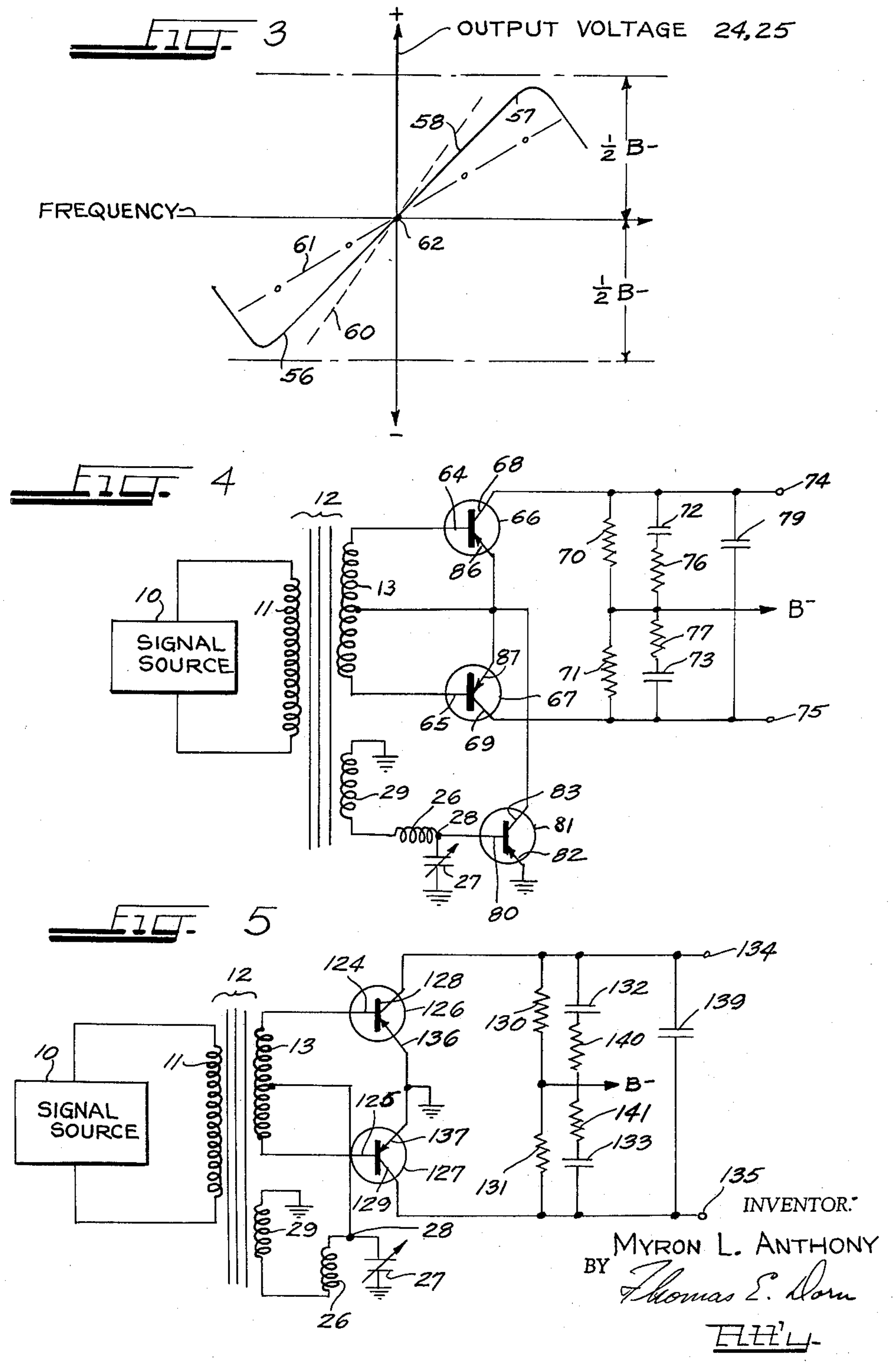
FIG. 3 illustrates the discriminator operating characteristic for the circuit of FIG. 1.
FIG. 4 is a simplified schematic wiring diagram for a frequency discriminator constructed in accordance with another embodiment of the invention.
FIG. 5 illustrates a further embodiment of the invention in simplified schematic form.

FIG. 3 affords a plot of the output voltage across terminal 24, 25 as a function of frequency of the intelligence signal applied to the discriminator from transformer 12. As indicated therein, the circuit exhibits the typical frequency discriminator operating characteristic with the output voltage constituting an essentially linear function of the input signal frequency over a substantial range between the points 56 and 57 on the characteristic curve 58. The maximum peak amplitude of the output signal in either polarity is approximately equal to one-half the supply voltage from source B—. With a purely resistive load, it is therefore apparent that the average output signal across the individual load resistors 20 and 21 is approximately equal to one-fourth of the supply voltage value; this output signal amplitude may be increased until it approaches approximately one-half the supply voltage by use of the capacitors 22 and 23. It is necessary, however, to afford some effective means for limiting the collector current of the transistors 15 and 17; for this reason, the current-limiting resistors 38 and 39 are connected in series with the capacitors 22 and 23 respectively. In some applications, a load device may be utilized which is responsive to the average voltage across the load resistors 20, 21, such as a meter, relay, or the like. Under such circumstances, if the increase in output afforded by the capacitors 22, 23 is not required, these capacitors, the current limiting resistors 38 and 39, and the filter capacitor 43 may be omitted.

In many instances, it may be desirable to alter the frequency range represented by the two points 56 and 57 on the characteristic curve 58 to obtain increased sensitivity over a more limited range or to afford a substantially broader discriminator range at the cost of some loss in sensitivity. This may be accomplished simply by increasing or decreasing the reactance-resistance ratio or "Q" of the tuned circuit 26, 27 to vary the discriminator characteristic as indicated by lines 60 and 61 in FIG. 3. The base or reference frequency for the discriminator circuit, represented by point 62 in the graph of FIG. 3, may be varied by tuning the series resonant circuit 26, 27 to the desired center frequency; for this purpose, it is preferable that capacitor 27 comprise a variable capacitor, although a variable inductor or a combination of a variable capacitor and a variable inductor may be employed if desired.

The balanced discriminator circuit of FIG. 1 is inherently self-limiting in operation to a substantial extent; consequently, in many applications the discriminator is capable of effective operation without requiring incorporation of a limiter stage in the signal source 10. The circuit exhibits an inherent immunity to harmonic distortion and is virtually independent, in operation, of the performance characteristics of the individual transtors employed therein.

FIG. 4 illustrates another embodiment of the invention; in this discriminator, as in the embodiment of FIG. 1, a frequency-modulated intelligence signal is supplied from a source 10 to the primary winding 11 of an input transformer 12 having a pair of secondary windings 13 and 29. One terminal of the winding 13 is connected to the base electrode 64 of a first transistor 66, whereas the other terminal of this winding is connected to the base electrode 65 of a second transistor 67. The collector electrode 68 of transistor 66 is connected to an operating potential source B— through a first load resistor 70, whereas the collector electrode 69 of the other transistor is connected to the D.C. source through a second load resistor 71. Resistors 70 and 71 may be shunted by a pair of capacitors 72 and 73 respectively; a pair of current-limiting resistors 76 and 77 are connected in series with capacitors 72 and 73 respectively. The output terminals of the discriminator are indicated at 74 and 75 and a filter capacitor 79 is connected across the output terminals. It is thus seen that the load circuit 70–77 for the discriminator is essentially the same as the load circuit of the first-described embodiment. As in the first-described embodiment, the capacitors 72, 73 and 79 and the limiting resistors 76 and 77 may be omitted where the load is primarily sensitive to D.C. rather than A.C. components in the output signal.

In some respects, the control or quadrature signal circuit of this embodiment of the invention is essentially similar to that of the first-described embodiment. Thus, the other secondary winding 29 of the transformer 12 is connected to a series resonant circuit comprising the coil 26 and the variable capacitor 27, the common terminal 28 of the inductor and capacitor being connected to the base electrode 80 of a third transistor 81. The emitter 82 of transistor 81 is ground and the collector 83 thereof is connected directly to the emitters 86 and 87 of the two discriminator transistors 66 and 67 respectively. In this instance, the collector 83 is also connected to the electrical center of the transformer secondary 13.

In many important respects, the discriminator circuit of FIG. 4 functions in essentially the same manner as that of FIG. 1. In other respects, however, it is somewhat different in operation. Thus, as in the first-described embodiment, the intelligence signal induced in the secondary winding 13 of the input 12 is applied in push-pull relationship to the two transistors 66 and 67 and therefore tends to render the transistors conductive in alternation with each other. Moreover, and as in the previously described circuit, the intelligence signal is also applied to the frequency-responsive phase-shifting device comprising the series resonant circuit 26—27 to generate a control signal having a frequency equal to the frequency of the intelligence signal but shifted in phase by an amount dependent upon the instantaneous frequency of the intelligence signal. Again, the phase shift at the desired reference or comparison frequency is ninety degrees, the reference frequency being determined by the tuning of the resonant circuit 26—27. In addition, and also as in the previous embodiment, the control signal output from the tune circuit 26, 27 is effectively applied to the transistors 66 and 67 with a polarity tending to render the transistors conductive in coincidence with each other. In this instance, however, this is not accomplished by utilizing the phase-shifted signal to control the bias on the emitters of the two transistors 66 and 67. Rather, the transistor 81 to which the phase-shifted intelligence signal is applied is connected in series with each of the transistors 66 and 67 and constitutes a gating device for the two transistors.

Thus, as in FIG. 1, the principal discharge path for the transistor 66 extends from the operating potential source B— through the resistor 70, the collector electrode 68 and the emitter 86 and through the collector 83 and the emitter 82 of the transistor 81 to ground. Similarly, the main conduction circuit for the transistor 67 includes the collector-emitter circuit of the transistor 81.

Despite the change in the control portion of the discriminator circuit, its basic mode of operation is essentially as described in connection with FIGS. 1–3. When the intelligence signal is at the reference frequency determined by the series resonant circuit 26, 27, each of the two transistors 66 and 67 is maintained conductive during one quarter of each operating cycle, since transistor 81 is conductive on alternate half cycles the phase shifted signal from the resonant circuit, which is ninety degrees out of phase with respect to the intelligence signal applied to the two transistors 66 and 67. When this phase relationship is changed to any substantial extent, due to variations in the frequency of the intelligence signal input, this balanced condition no longer obtains and one of the two transistors 66 and 67 conducts over a substantially longer period than the other. Consequently, the output signal appearing at terminal 74 and 75 is approximately zero at the reference frequency; when the intelligence signal varies from that reference frequency, the output signal developed at the terminal 74 and 75 has an amplitude and polarity determined by the degree and direction of change in the intelligence signal frequency with respect to the reference frequency. As in the case of the first described embodiment, the discriminator of FIG. 4 is inherently self-limiting. Moreover, its operational characteristics are essentially independent of the operating characteristics of the individual transistors employed therein. Because all three of the transistors 66, 67 and 81 function as square wave generators, the circuit is substantially immune to distortion due to input signals of high harmonic content.

The embodiment of FIG. 5 is somewhat simpler than the discriminators described hereinabove in connection with FIGS. 1 and 4 yet affords a highly effective discriminator action. In this discriminator, as before, the intelligence signal source 10 is connected to the primary 11 of an input transformer 12 having a pair of secondaries 13 and 29. The two terminals of winding 13 are connected to the base electrodes 124 and 125 of a pair of transistors 126 and 127. The load circuit for the discriminator may be essentially similar to that of the previously described embodiments and may comprise a first load resistor 130 connecting the collector 128 of transistor 126 to a negative-polarity operating potential source B—. The collector 129 of the second transistor is connected to B— through a second load resistor 131. The load resistors 130 and 131 may be shunted by the capacitors 132 and 133 respectively, provided current limiting resistors as 140 and 141 are utilized. As before, the output from the discriminator is taken across the two load resistors, the output terminals being indicated at 134 and 135. A filter capacitor 139 is connected across the output terminals. The emitters 136 and 137 of the transistors 126 and 127 are grounded.

As before, the secondary winding 29 of the transformer 12 is connected to a frequency-responsive phase-shifting device comprising the inductor 26 connected in series with the variable capacitor 27 to form a series resonant circuit which may be adjusted to the desired reference frequency. In this instance, however, the phase-shifted control signal appearing at the terminal 28 of the resonant circuit is not applied to a further discharge device to generate a gating signal or to control conduction in such a device. Rather, terminal 28 is connected back to the electrical mid-point of the secondary winding 13 so that the control signal is applied directly to the base electrodes 124 and 125 of transistors 126 and 127. Because the control signal is thus applied in push-push relationship to the two discharge devices 126 and 127, it tends to render those devices conductive in coincidence with each other.

The discriminator of FIG. 5, like each of the other discriminator devices described hereinabove, affords an output signal across the terminals 134 and 135 which has an amplitude and polarity representative of variations in the intelligence signal frequency with respect to the reference frequency determined by the tuning of the series resonant circuit 26, 27. As before, the output across terminals 134 and 135 is negligible at the reference frequency and the peak-to-peak output voltage is approximately equal to the B— voltage. In applications where the load comprises a device responsive to the average output voltage, the filter capacitors and resistors may be omitted.

Figure 6:
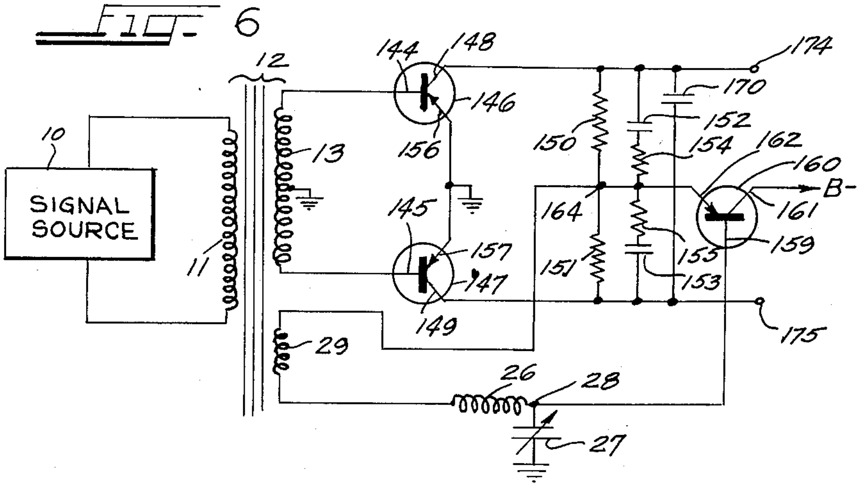
FIG. 6 is a simplified schematic wiring diagram of yet another embodiment of the invention.

FIG. 6 shows another embodiment of the invention which is essentially similar in many respects to the embodiment of FIG. 4. As before, the intelligence signal source 10 applies a frequency modulated signal to the primary winding 11 of the input transformer 12 to induce a signal in the two secondaries 13 and 29 of the transformer. As before, the two ends of the winding 13 are connected to the base electrodes 144 and 145 of a pair of transistors 146 and 147. The two collector electrodes 148 and 149 of the transistors are connected to the usual load circuit comprising the two load resistors 150 and 151 and the capacitors 152 and 153 connected in parallel therewith, a pair of current limiting resistors 154 and 155 being connected in series with capacitors 152 and 153. A filter capacitor 170 is connected across the output terminals 174 and 175. Moreover, and as in the embodiment of FIG. 4, the other secondary winding 29 of the transformer is connected to a series resonant circuit comprising the coil 26 and the variable capacitor 27, the common terminal of these two circuit elements being indicated by the reference numeral 28.

In this embodiment of the invention, however, the center tap on the winding 13 of the input transformer is grounded and the two emitter electrodes 156 and 157 of the transistors 146 and 147 are also grounded. The terminal 28 of the phase shifting device 26, 27 is connected to the base electrode 159 of another transistor 160. Transistor 160 comprises a switch incorporated in the discharge path of the two transistors 146 and 147; the collector electrode 161 of the transistor is connected to the D.C. source B— and the emitter 162 thereof is connected to the common terminal 164 of the load resistors 150 and 151. The winding 29 is also returned to this terminal.

Operationally, the embodiment of FIG. 6 is essentially similar to that of FIG. 4 in that the third or control transistor is essentially a switch incorporated in the discharge paths of the two transistors included in the balanced discriminator circuit. The principal difference embodied in FIG. 6 is the incorporation of the control switch in the load circuit side of the discharge paths of transistors 146 and 147 rather than in the emitter circuits of those transistors. In all other respects, the embodiment of FIG. 6 is essentially the same as that of FIG. 4.

Figure 7:
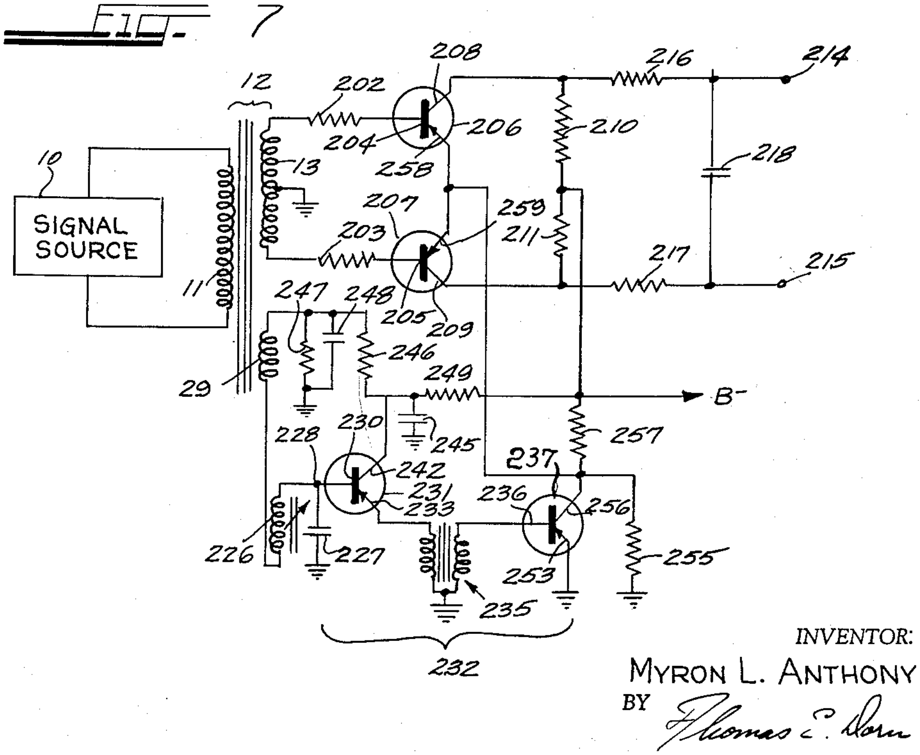
FIG. 7 illustrates, in detailed schematic form, the discriminator of FIG. 1 as incorporated in a particular application.

FIG. 7 illustrates the discriminator of FIG. 1 in complete detail with all of the biasing and other circuit elements shown in order to afford a typical illustration of a discriminator constructed in accordance with the invention as employed in an operational circuit. In this embodiment, as in the previously described arrangements, a frequency modulated intelligence signal is supplied from a signal source 10 to the primary winding 11 of a transformer 12 having two secondary windings 13 and 29. One end of the winding 13 is connected through a resistor 202 to the base electrode 204 of a first transistor 206. The opposite end of the winding 13 is connected through a resistor 203 to the base electrode 205 of a second transistor 207. The collector electrode 208 of transistor 206 is connected to a source of uni-directional operating potential B— through a first load resistor 210, whereas the collector electrode 209 of transistor 207 is connected to the D.C. source through a second load resistor 211. As before, the collector electrodes 208 and 209 are connected to the output terminals 214 and 215 of the discriminator. In this instance, a filter is interposed between the two transistors and the output terminals of the discriminator; this filter comprises a pair of resistors 216 and 217 connected in series with the output terminals 214 and 215 respectively and a capacitor 218 connected across the output terminals. It should be noted that the resistors 216 and 217 are necessary to operation of the device in the intended manner; with use of a purely capacitive collector load the current would not be a square wave and balanced operation would depend on the operating characteristics of the individual transistors.

In the embodiment of FIG. 7, the means employed to develop the requisite phase-shifted control signal is somewhat more complex than in the circuit arrangements described hereinabove. Nevertheless, the basic circuit operation is essentially similar. Thus, one end of the secondary winding 29 of the input transformer 12 is connected to a series resonant circuit comprising a variable inductance 226 and a capacitor 227, the common terminal of these two elements being indicated at 228. The series-resonant circuit 226, 227 corresponds to the tuned circuit 26, 27 of the previously described embodiments and constitutes a resonant frequency-responsive phase-shifting device for generating a control signal.

The output terminal 228 of the resonant circuit 226, 227 is coupled to the base electrode 230 of a transistor 231 incorporated in the first stage of a control signal amplifier 232. The emitter electrode 233 of the transistor 231 is coupled, through an interstage coupling transformer 235, to the base electrode 236 of a second transistor 237 included in the amplifier 232.

The collector electrode 242 of the transistor 231 is connected to the D.C. source B— through a resistor 244, being by-passed to ground for signal frequencies through a capacitor 245. The resistor 244 comprises one leg of a voltage divider, the remainder of the voltage divider comprising a pair of resistors 246 and 247 connected in series with the resistor 244 and being returned to ground. A by-pass capacitor 248 is connected in shunt with the resistor 247, which is also connected to the secondary winding 29 of the input transformer 12.

The emitter electrode 253 of the transistor 237 is returned to ground. The collector 256 is connected to a voltage divider comprising a pair of resistors 255 and 257 connected between the D.C. source B— and ground and is also coupled to the emitter electrodes 258 and 259 of the two discriminator transistors 206 and 207.

Operationally, the embodiment of FIG. 7 is essentially similar to that of FIG. 1. The frequency-modulated intelligence signal induced in the secondary winding 13 of the input transformer 12 is applied in push-pull relation to the base electrodes 204 and 205 of the transistors 206 and 207. The resistors 202 and 203 in the input circuit to the transistors 206 and 207 are made relatively large in order to afford a relatively constant-current signal input to the transistors. As in the previously described embodiments, however, the intelligence signal applied to the base electrodes of the two discriminator transistors is not sufficient to render these devices conductive, since the emitters of the two transistors are normally biased to cut off by means of the connection to the voltage divider comprising resistors 255 and 257.

The intelligence signal induced in the other secondary winding 29 of the input transformer is applied to the frequency-responsive phase-shifting device comprising the tuned circuit 226, 227 to generate the desired control signal. This control signal is amplified in the amplifier 232 and utilized to develop a square wave output voltage in the collector circuit of transistor 237. As before, the output signal from the square wave generator is applied to the emitter electrodes 258 and 259 of the transistors 206 and 207 to afford the discriminator action described hereinabove in connection with FIGS. 2 and 3.

In order to afford a more complete and detailed description of the construction of the embodiment of FIG. 7, specific data concerning this circuit, including transistor types and the impedance values of certain circuit elements, are set forth hereinafter. It should be understood that this material is included solely by way of illustration and in no sense as a limitation on the invention.

*Transistors*

| | |
|---|---|
| All transistors | CK–751 or equivalent. |

*Resistors*

| | |
|---|---|
| **202, 203** | 3.3 kilo-ohms. |
| **210,211** | 2.2 kilo-ohms. |
| **216, 217** | 3.3 kilo-ohms. |
| **244** | 1.5 kilo-ohms. |
| **246, 247** | 10 kilo-ohms. |
| **255** | 4.7 kilo-ohms. |
| **257** | 22 kilo-ohms. |

*Capacitors*

| | |
|---|---|
| **218** | 0.25 microfarad. |
| **245, 248** | 25 microfarads. |

*Inductances*

| | |
|---|---|
| **226** | 0.5–1.5 henries. |

*D.C. Supply*

| | |
|---|---|
| B— | 45 volts negative. |

Each of the embodiments of the invention described hereinabove affords substantial advantages as compared with previously known discriminator circuits. Alignment of the discriminator circuits is relatively simple; in most instances this is accomplished simply by adjustment of one variable capacitance or inductance. The discriminators of the invention do not require the use of double-tuned input transformers and are inherently simple and economical in construction. They afford inherent self-limiting characteristics and are easily constructed to be substantially independent of variations in the operating characteristics of the individual transistors. In addition, the discriminators exhibit a high degree of inherent immunity to harmonic disturbances.

Hence, while I have illustrated and described the preferred embodiments of my invention, it is to be understood that these are capable of variation and modification.

I claim:

1. A frequency discriminator comprising: a pair of electric discharge devices each including an input electrode, an output electrode, and a control electrode; load circuit means, coupled to said devices and including a pair of load impedances individually coupling the output electrodes of said discharge devices to a source of unidirectional operating potential, for limiting the output signal from said devices to a predetermined maximum value; means for applying an intelligence signal to the control electrodes of said discharge devices with a polarity tending to render said devices conductive in alternation with each other; a frequency-responsive phase-shifting device; means for applying the intelligence signal to the phase-shifting device to generate a control signal at the intelligence signal frequency but shifted in phase to an extent determined by that frequency, the phase shift at a given reference frequency being ninety degrees; and means for effectively applying said control signal to said electric discharge devices with a polarity tending to render said devices conductive in coincidence with each other to develop in said load circuit an output signal having an amplitude and polarity determined by the relative duration of time intervals during which said devices are conductive.

2. A frequency discriminator comprising: a pair of electric discharge devices each including an input electrode, an output electrode, and a control electrode; a load circuit including a pair of load impedances individually coupling the output electrodes of said discharge devices to a source of unidirectional operating potential; means including an input transformer for applying an intelligence signal to the control electrodes of said discharge devices with a polarity tending to render said devices conductive in alternation with each other; a frequency-responsive phase-shifting device, comprising a series-resonant circuit coupled to said input transformer, for generating a control signal at the intelligence signal frequency but shifted in phase to an extent determined by that frequency, the phase shift at the resonance frequency of said circuit being ninety degrees; means for effectively applying said control signal to said electric discharge devices with a polarity tending to render said devices conductive in coincidence with each other to develop in said load circuit an output signal indicative of variations in the intelligence signal fundamental frequency with respect to the resonance frequency independently of harmonic content of the intelligence signal; and means, included in said load circuit, for limiting said output signal to a predetermined maximum value.

3. A frequency discriminator comprising: a pair of electric discharge devices each including an input electrode, an output electrode, and a control electrode; a load circuit including a pair of load impedances individually coupling the output electrodes of said discharge devices to a source of unidirectional operating potential; means for applying an intelligence signal to the control electrodes of said discharge devices with a polarity tending to render said devices conductive in alternation with each other; a frequency-responsive phase-shifting device; means for applying the intelligence signal to the phase-shifting device to generate a control signal at the intelligence signal frequency and shifted in phase to an extent determined by that frequency, the phase shift at a given reference frequency being ninety degrees; a third electric discharge device having a load circuit coupled to said pair of electric discharge devices; means for applying said control signal to said third electric discharge device to control conduction in said device and to condition said pair of discharge devices for conduction in coincidence with each other to develop in said load circuit an output signal indicative of variations in the intelligence signal fundamental frequency with respect to the reference frequency independently of harmonic content of the intelligence signal; and means, included in the load circuits of said devices, for limiting each of said devices to operation as a square wave generator.

4. A frequency discriminator comprising: a pair of transistors each including an emitter electrode, a collector electrode, and a base electrode; a load circuit including a pair of load impedances individually coupling the collector electrodes of said transistors to a source of unidirectional operating potential and limiting the output current from said transistors to a predetermined maximum value; means for applying a frequency modulated intelligence signal, in effective push-pull relationship, to the base electrodes of said transistors; a frequency-responsive phase-shifting device; means for applying the intelligence signal to the phase-shifting device to generate a control signal, at the intelligence signal frequency but shifted in phase to an extent determined by the intelligence signal frequency, the phase shift at a given reference frequency being ninety degrees; a third transistor having an emitter electrode, a collector electrode, and a base electrode, said collector electrode being coupled to said pair of transistors in push-push relation; and means for applying said control signal to the base electrode of said third transistor to control conduction therein and thereby condition said pair of transistors for conduction in time coincidence with each other to develop in the load circuit an output signal indicative of variations in the intelligence signal fundamental frequency with respect to said reference frequency independently of harmonic content of the intelligence signal.

5. A frequency discriminator comprising: a pair of transistors each including an emitter electrode, a collector electrode, and a base electrode; a load circuit including a pair of current-limiting load impedances individually coupling the collector electrodes of said transistors to a source of unidirectional operating potential; means for appling a frequency modulated intelligence signal, in effective push-pull relationship, to the base electrodes of said transistors; a frequency-responsive phase-shifting device having a predetermined resonance frequency; means for applying the intelligence signal to the phase-shifting device to generate a control signal, at the intelligence signal frequency but shifted in phase to an extent determined by the intelligence signal frequency, the phase shift at said resonance frequency being ninety degrees; a third transistor having an emitter electrode, a collector electrode, and a base electrode, said collector electrode being coupled to the emitter electrodes of said pair of transistors in push-push relation; and means for applying said control signal to the base electrode of the third transistor to switch said third transistor between a conductive and a non-conductive state and thereby condition said pair of transistors for conduction in time coincidence with each other to develop in the load circuit an output signal indicative of variations in the intelligence signal fundamental frequency with respect to said resonance frequency independently of harmoic content of the intelligence signal.

6. A frequency discriminator comprising: a pair of transistors each including an emitter electrode, a collector electrode, and a base electrode; a load circuit including a pair of current-limiting load impedances individually coupling the collector electrodes of said transistors to a source of undirectional operating potential; means for applying a frequency modulated intelligence signal, in effective push-pull relationship, to the base electrodes of said transistors; a frequency-responsive phase-shifting device having a predetermined resonance frequency; means for applying the intelligence signal to the phase-shifting device to generate a control signal, at the intelligence signal frequency, shifted in phase through a phase angle and in a direction determined by the intelligence signal frequency, the phase shift at said resonance frequency being ninety degrees; a third transistor having an emitter electrode, a collector electrode, and a base electrode, said collector electrode being coupled in series with the emitter-collector discharge paths of said pair of transistors; and means for applying said control signal to the base electrode of said third transistor to control conduction therein and thereby condition said pair of transistors for conduction in time coincidence with each other to develop in the load circuit an output signal indicative of variations in the intelligence signal fundamental frequency with respect to said resonance frequency independently of harmonic content of the intelligence signal.

7. A frequency discriminator comprising: a pair of transistors each including an emitter electrode, a collector electrode, and a base electrode; a load circuit including a pair of load impedances individually coupling the collector electrodes of said transistors to a source of unidirectional operating potential; means for applying a frequency modulated intelligence signal, in push-pull relationship, to the base electrodes of said transistors; a frequency-responsive phase-shifting device having a predetermined resonance frequency; means for applying the intelligence signal to the phase-shifting device to generate a control signal, at the intelligence signal frequency, shifted in phase through a phase angle and in a direction determined by the intelligence signal frequency, the phase shift at said resonance frequency being ninety degrees; a square wave generator comprising a transistor having an emitter electrode, a collector electrode, and a base electrode, said collector electrode being coupled to the emitter electrodes of said pair of transistors in push-push relation; and means for applying said control signal to the base electrode of the square wave generator to control conduction therein and thereby condition said pair of transistors for conduction in time coincidence with each other to develop in the load circuit an output signal indicative of variations in the intelligence signal fundamental frequency with respect to said resonance frequency indepedently of harmonic content of the intelligence signal.

8. A frequency discriminator comprising: a pair of electric discharge devices; a load circuit including individual current-limiting load impedances for couplng said devices to a source of operating potential; means for applying an intelligence signal to said discharge devices with a polarity tending to render said devices conductive in alternation with each other; a frequency-responsive phase-shifting device; means for applying the intelligence signal to said phase-shifting device to generate a control signal having a frequency equal to the frequency of said intelligence signal but shifted in phase by an amount determined by the frequency of said intelligence signal, the phase shift at a given reference frequency being ninety degrees; and means for applying said control signal to said electric discharge devices, with a polarity tending to render said devices conductive in coincidence with each other but effectve to render said devices conductive only in conjunction with said intelligence signal to develop in said load circuit an output signal having an amplitude representative of variations of the intelligence signal frequency with respect to said reference frequency.

9. A frequency discriminator comprising: a pair of electric discharge devices; a load circuit including individual current-limiting load impedances for coupling said devices to a source of operating potential; means for applying an intelligence signal to said discharge devices in push-pull relationship; a frequency-responsive phase-shifting device comprising a series-resonant circuit; means for applying the intelligence signal to said phase-shifting device to generate a control signal having a frequency equal to the frequency of said intelligence signal but shifted in phase by an amount and in a direction determined by the frequency of said intelligence signal, the phase shift at the resonant frequency of the phase-shifting device being ninety degrees; and means for applying said control signal to said electric discharge devices in push-push relationship to develop in said load circuit an output signal having an amplitude and polarity determined by the relative duration of time intervals during which said devices are conductive.

10. A frequency discriminator comprising: a pair of electric discharge devices; a load circuit including current-limiting load impedances for coupling said devices to a source of operating potential; means for applying an intelligence signal to said discharge devices with a polarity tending to render said devices conductive in alternation with each other; a frequency-responsive phase-shifting device; means for applying said intelligence signal to said phase-shifting device to generate a control signal having a frequency equal to the frequency of said intelligence signal but shifted in phase by an amount and in a direction determined by the frequency of said intelligence signal, the phase shift at a given reference frequency being ninety degrees; and means for applying said control signal to said electric discharge devices, with a polarity tending to render said devices conductive in coincidence with each other but effective to render said devices conductive only in conjunction with said intelligence signal to develop in said load circuit an output signal having an amplitude and polarity determined by the relative duration of time intervals during which said devices are conductive.

11. A frequency discriminator comprising: a pair of square-wave amplifiers, each comprising a transistor including an emitter electrode, a collector electrode, a base electrode, and a current-limiting resistive load circuit interconnecting the collector electrodes in series opposing relationship to each other and connecting said collector electrodes to a source of uni-directional operating potential; means for applying a frequency-modulated intelligence signal, in effective push-pull relationship, to the base electrodes of said transistors; a third square-wave amplifier, comprising a transistor including an emitter electrode, a collector electrode, a base electrode, and a current-limiting resistive circuit connecting the collector electrode to a source of undirectional operating potential and coupled to said first-mentioned square wave amplifiers in push-push relation; and means, comprising a frequency-responsive phase-shifting device, for applying the intelligence signal to the base electrode of said third square wave amplifier with a phase shift determined by the intelligence signal frequency, the phase shift at a given reference frequency being ninety degrees, to control conduction in said third amplifier and develop in said load circuit an output signal indicative of variations of the intelligence signal frequency with respect to the reference frequency.

12. A frequency discriminator comprising: a pair of square-wave amplifiers, each comprising a transistor including an emitter electrode, a collector electrode, a base electrode, and a current-limiting resistive load circuit interconnecting the collector electrodes in series opposing relationship to each other and connecting said collector electrodes to a source of unidirectional operating potential; means for applying a frequency-modulated intelligence signal, in effective push-pull relationship, to the base electrodes of said transistors; a third square-wave amplifier, comprising a transistor including an emitter electrode, a collector electrode, a base electrode, and a current-limiting resistive circuit connecting the collector electrode to a source of unidirectional operating potential and coupled to the emitter electrodes of said first-mentioned square wave amplifiers in push-push relation; and means, comprising a series-resonant circuit for applying the intelligence signal to the base electrode of said third square wave amplifier with a phase shift determined by the intelligence signal frequency, to control conduction in said third amplifier and develop in said load circuit an output signal indicative of variations of the intelligence signal frequency with respect to the resonance frequency of said series-resonant circuit.

13. A frequency discriminator comprising: a pair of square-wave amplifiers, each comprising a transistor including an emitter electrode, a collector electrode, a base electrode, and a current-limiting resistive load circuit inter-connecting the collector electrodes in series opposing relationship to each other and connecting said collector electrodes to a source of unidirectional operating potential; means for applying a frequency-modulated intelligence signal, in effective push-pull relationship, to the base electrodes of said transistors; a third transistor including an emitter electrode, a collector electrode, a base electrode, having the emitter-collector discharge path thereof connected in series with the emitter-collector circuits of said pair of amplifiers; and means, comprising a frequency-responsive phase-shifting device, for applying the intelligence signal to the base electrode of said third transistor with a phase shift determined by the intelligence signal frequency, the phase shift at a given reference frequency being ninety degrees, to control conduction in said third amplifier and develop in said load circuit an output signal indicative of variations of the intelligence signal frequency with respect to the reference frequency.

14. A frequency discriminator comprising: a first switching circuit comprising a first load impedance and a first signal-controlled electronic switching device connected in series with each other; a second switching circuit comprising a second load impedance and a second signal-controlled electronic switching device connected in series with each other, said load impedances being connected to each other; means for applying a frequency-modulated intelligence signal to said switching devices with a polarity and amplitude effective to render said devices conductive in alternation to each other; a control circuit connecting said switching circuits to a source of unidirectional operating potential, said control circuit including a third signal-controlled electronic switching device for controlling conduction in said first two switching devices; means, comprising a frequency-responsive phase-shifting device, for applying said intelligence signal to said third switching device, to actuate said third switching device, with a phase shift determined by the intelligence signal frequency, the phase shift at a given frequency being ninety degrees; and an output circuit, connected across said load impedances, for developing an output signal having an amplitude and polarity determined by the relative duration of time intervals during which said first and second switching devices are conductive, and thus representative of variations of the fundamental frequency of said intelligence signal from said reference frequency, independently of harmonic content of said intelligence signal.

15. A frequency discriminator comprising: a first switching circuit comprising a first load impedance and a first signal-controlled electronic switching device connected in series with each other; a second switching circuit comprising a second load impedance and a second signal-controlled electronic switching device connected in series with each other, said load impedances being connected to each other; means for applying a frequency-modulated intelligence signal to said switching devices with a polarity and amplitude effective to render said devices conductive in alternation to each other; a control circuit connecting said switching circuits to a source of unidirectional operating potential, said control circuit including a third signal-controlled electronic switching device effectively connected in series with each of said first and second switching circuits; means, comprising a frequency-responsive phase-shifting device, for applying said intelligence signal to said third switching device, to control said third switching device, with a phase shift determined by the intelligence signal frequency, the phase shift at a given frequency being ninety degrees; and an output circuit, connected across said load impedances, for developing an output signal having an amplitude and polarity determined by the relative duration of time intervals during which said first and second switching devices are conductive, and thus representative of variations of the fundamental frequency of said intelligence signal from said reference frequency, independently of harmonic content of said intelligence signal.

16. A frequency discriminator comprising: a first switching circuit comprising a first load impedance and a first transistor switching device connected in series with each other; a second switching circuit comprising a second load impedance and a second transistor switching device connected in series with each other, said load impedances being connected to each other; means for applying a frequency-modulated intelligence signal to said switching devices with a polarity and amplitude effective to render said devices conductive in alternation to each other; a control circuit connecting said switching circuits to a source of unidirectional operating potential, said control circuit including a third transistor device and means connecting said third transistor switching device to said first and second switching devices to prevent conduction in said first and second devices except when said third device is conductive; means, comprising a frequency-responsive phase-shifting device, applying said intelligence signal to said third switching device, to control conduction thereof, with a phase shift determined by the intelligence signal frequency, the phase shift at a given frequency being ninety degrees; and an output circuit, connected across said load impedances, for developing an output signal having an amplitude and polarity determined by the relative duration of time intervals during which said first and second switching devices are conductive, and thus representative of variations of the fundamental frequency of said intelligence signal from said reference frequency, independently of harmonic content of said intelligence signal.

17. A frequency discriminator comprising: a pair of square-wave amplifiers, each comprising a discharge device including an input electrode and an output electrode, and a current-limiting resistive load circuit interconnecting the output electrodes in series opposing relation to each other and connecting said output electrodes to a source of unidirectional operating potential; means for applying a frequency-modulated intelligence signal to said discharge devices, in effective push-pull relation, to condition said devices for conduction in alternation with each other; a third square-wave amplifier, comprising a third discharge device including input and output electrodes and a current-limiting resistive load impedance connecting the output electrode to a source of unidirectional operating potential; means for coupling the output electrode of said third square-wave amplifier in effective push-push relation to said first and second discharge devices render said first and second devices conductive only during time intervals when said first and second devices are conditioned for conduction by said intelligence signal and said third discharge device is conductive; means, comprising a frequency-responsive phase-shifting device, for applying said intelligence signal to said third discharge device with a phase shift determined by the intelligence signal frequency, the phase shift being ninety degrees at a given reference frequency, to control conduction in said third discharge device; and an output circuit, connected across said load circuit, for developing an output signal having an amplitude and polarity determined by the relative duration of time intervals in which said first and second discharge devices are conductive and therefore representative of variations in the fundamental frequency of said intelligence signal, independent of harmonics, with respect to said reference frequency.

References Cited in the file of this patent

UNITED STATES PATENTS

| | | |
|---|---|---|
| 2,361,625 | Hansell | Oct. 31, 1944 |
| 2,415,468 | Webb | Feb. 11, 1947 |
| 2,652,489 | Robinson | Sept. 15, 1953 |
| 2,857,517 | Jorgensen et al. | Oct. 21, 1958 |